US011680816B2

(12) United States Patent
Winton et al.

(10) Patent No.: US 11,680,816 B2
(45) Date of Patent: Jun. 20, 2023

(54) SPATIAL INFOTAINMENT RENDERING SYSTEM FOR VEHICLES

(71) Applicant: HARMAN INTERNATIONAL INDUSTRIES, INCORPORATED, Stamford, CT (US)

(72) Inventors: Riley Winton, Canton, MI (US); Christopher Michael Trestain, Livonia, MI (US); Chris Ludwig, Birmingham, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 283 days.

(21) Appl. No.: 16/958,913

(22) PCT Filed: Dec. 17, 2018

(86) PCT No.: PCT/IB2018/060199
§ 371 (c)(1),
(2) Date: Jun. 29, 2020

(87) PCT Pub. No.: WO2019/130156
PCT Pub. Date: Jul. 4, 2019

(65) Prior Publication Data
US 2020/0340824 A1    Oct. 29, 2020

Related U.S. Application Data

(60) Provisional application No. 62/611,746, filed on Dec. 29, 2017.

(51) Int. Cl.
G01C 21/36    (2006.01)
B60K 35/00    (2006.01)
G08G 1/0967   (2006.01)

(52) U.S. Cl.
CPC .......... *G01C 21/3691* (2013.01); *B60K 35/00* (2013.01); *G01C 21/3688* (2013.01);
(Continued)

(58) Field of Classification Search
USPC ........................................................ 701/423
See application file for complete search history.

(56) References Cited

U.S. PATENT DOCUMENTS

2008/0215239 A1    9/2008  Lee
2012/0150436 A1*   6/2012  Rossano ............ G01C 21/3694
                                                          701/425
(Continued)

FOREIGN PATENT DOCUMENTS

DE    19930638 A1    1/2001
JP    2005008020 A   1/2005
(Continued)

OTHER PUBLICATIONS

Moore, D., Boslem, S., Charissis, V., "Optimisation of Sound Localisation for Emergency Vehicle Sirens through a Prototype Audio System," Pervasive: International Conference on Pervasive Computing, vol. 6770, Chapter 21, pp. 177-186, 2011 https://link.springer.com/chapter/10.1007%2F978-3-642-21708-1_21.

*Primary Examiner* — Tyler D Paige
(74) *Attorney, Agent, or Firm* — Brooks Kushman, P.C.

(57) ABSTRACT

A spatial infotainment rendering system may include at least one infotainment device configured to present information to a vehicle occupant traveling along a vehicle route at one of a plurality of infotainment locations within the vehicle and at least one spatial rendering processor. The processor may be configured to receive vehicle location and direction information of the vehicle along the vehicle route, receive event data indicative of an event having a potential to affect the vehicle route, and determine an event location based on event data. The processor may also be configured to select (Continued)

one of the infotainment locations based on the event location relative to the vehicle location and direction to present event information to the vehicle occupant relating to the event at a location spatially related to the event location relative to the vehicle route.

20 Claims, 7 Drawing Sheets

(52) U.S. Cl.
CPC .. *B60K 2370/152* (2019.05); *B60K 2370/157* (2019.05); *B60K 2370/158* (2019.05); *B60K 2370/164* (2019.05)

(56) References Cited

U.S. PATENT DOCUMENTS

| | | |
|---|---|---|
| 2013/0158856 A1 | 6/2013 | Xiang |
| 2016/0282129 A1* | 9/2016 | Wang ................... H04B 17/318 |
| 2017/0279957 A1* | 9/2017 | Abramson et al. . H04M 1/6075 |
| 2017/0300194 A1* | 10/2017 | Lee ..................... G06F 3/04817 |
| 2022/0212679 A1* | 7/2022 | Winther ................ B60K 35/00 |

FOREIGN PATENT DOCUMENTS

| | | |
|---|---|---|
| JP | 2008249355 A | 10/2008 |
| JP | 2013533703 A | 8/2013 |
| JP | 2016076037 A | 5/2016 |
| WO | 2017146704 A1 | 8/2017 |

* cited by examiner

SPATIAL INFOTAINMENT RENDERING SYSTEM FOR VEHICLES

CROSS-REFERENCE TO RELATED APPLICATIONS

This application is the U.S. National Phase of PCT/IB2018/060199 filed Dec. 17, 2017, which claims the benefit of U.S. provisional application Ser. No. 62/611,746 filed Dec. 29, 2017, the disclosures of which are hereby incorporated in their entirety by reference herein.

TECHNICAL FIELD

Disclosed herein are spatial infotainment rendering system for vehicles.

BACKGROUND

Vehicles are often equipped with various systems that provide information to a driver. Once of such systems are navigation systems configured to provide audible prompts for turn-by-turn directions to the driver in an effort to guide the driver to a desired location. The navigation system typically includes a global positioning system (GPS) that tracks the changing location of the vehicle. When a user enters a desired destination, the navigation system may present an acoustic route overview that is audibly reproduced on at least on speaker within the vehicle. The turn-by turn route may also include distance information as well as information related to the curvature of sharpness of an upcoming turn. For example, an audio command via a computer voice may announce "slight left turn at point five miles," or "hard right turn in one hundred feet."

SUMMARY

A spatial infotainment rendering system may include at least one infotainment device configured to present information to a vehicle occupant traveling along a vehicle route at one of a plurality of infotainment locations within the vehicle and at least one spatial rendering processor. The processor may be configured to receive vehicle location and direction information of the vehicle along the vehicle route, receive event data indicative of an event having a potential to affect the vehicle route, and determine an event location based on event data. The processor may also be configured to select one of the infotainment locations based on the event location relative to the vehicle location and direction to present event information to the vehicle occupant relating to the event at a location spatially related to the event location relative to the vehicle route.

A method for spatially providing information about an upcoming event along a vehicle route may include receiving vehicle location and direction information of a vehicle along a vehicle route, receiving event data indicative of an event having a potential to affect the vehicle route, determining whether the event is within a predefined distance of the vehicle location, and determining whether the event is along the vehicle route. The method may also include selecting, in response to the event being within a predefined distance of the vehicle location and along the vehicle route, an infotainment location within the vehicle based on the event location relative to the vehicle location and direction to present event information to a vehicle occupant relating to the event at a location spatially related to the event location relative to the vehicle route.

A spatial infotainment rendering system for a vehicle may include at least one infotainment device configured to present information to a vehicle occupant traveling along a vehicle route at one of a plurality of infotainment locations within the vehicle and at least one spatial rendering processor. The processor may be configured to receive vehicle location and direction information of a vehicle along a vehicle route, receive event data indicative of an event having a potential to affect the vehicle route, and determine whether the event is within a predefined distance of the vehicle location. The processor may also be configured to determine whether the event is along the vehicle route, and select, in response to the event being within a predefined distance of the vehicle location and along the vehicle route, an infotainment location within the vehicle based on the event location relative to the vehicle location and direction to present event information to a vehicle occupant relating to the event at a location spatially related to the event location relative to the vehicle route.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle drivers and passengers may desire enhanced audible prompts in a vehicle audio system in order to aid a driver in better understanding a command relative to the location of an event. Described herein is a spatial rendering approach of in-vehicle infotainment systems. Techniques to reproduce auditory stimuli with spatial processing are generally desired by drivers to place audio events spatially throughout a vehicle cabin. A driver may experience augmented audio in a vehicle cabin for stimuli such as weather prompts, navigation prompts, and other infotainment features. This technology relies on inputs from connected car subsystems, including but not limited to GPS, calendar, and navigational inputs. For example, if a user is driving northbound, but a weather information source indicates a major storm is approaching from the west, this spatial reproduction system may playback storm audio stimuli perceptually from the left side of the vehicle cabin.

Current vehicle infotainment systems rely heavily on visuospatial and haptic user interactions. These methods not only require direct eye contact, but also place a heavy cognitive load on the user or driver. Clashes between the visuo-centric task of driving and these current user interactions are a primary cause for increased accident rates in the modern driving world. This system alleviates some of the visual cognitive load and allows the user to naturally and automatically perceive prompts in a highly streamlined manner. The user may appreciate a more seamless interaction with the infotainment system. The user may automatically perceive the spatial prompt and apply necessary counter-behaviors without requiring visual attention or additional cognitive processing.

Figure 1:
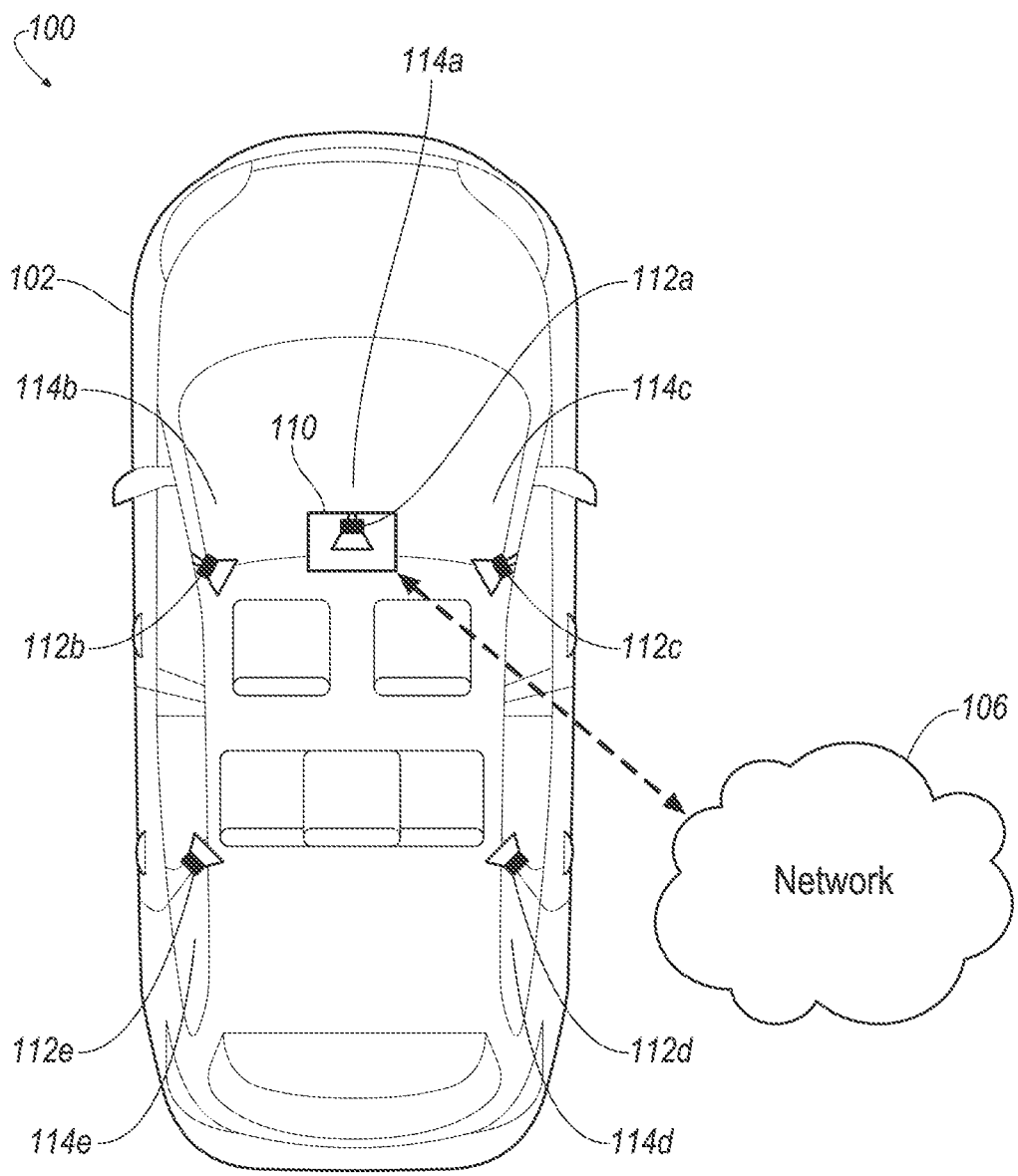
FIG. 1 illustrates an example spatial infotainment rendering system for a vehicle.
Figure 2:
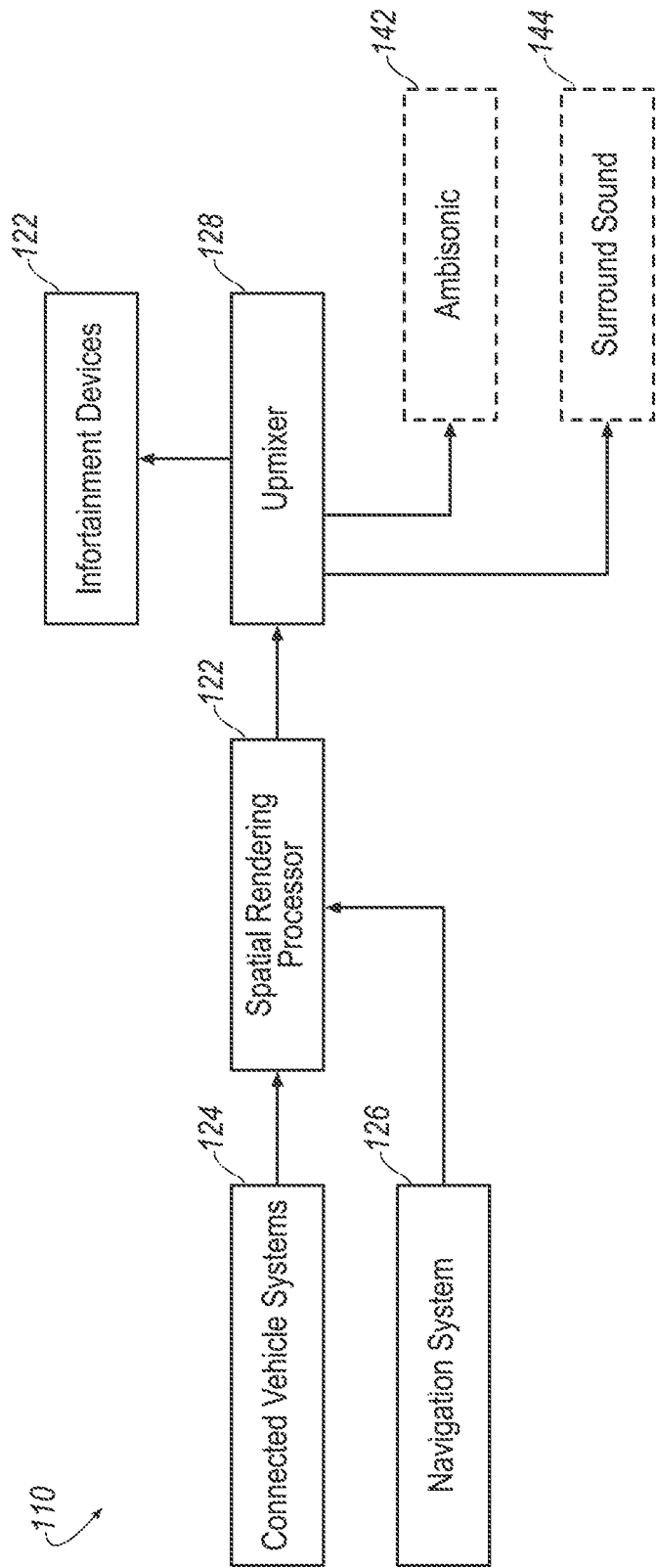
FIG. 2 illustrates an example block diagram of the spatial infotainment rendering system of FIG. 1.

FIG. 1 illustrates an example spatial infotainment rendering system 100 for a vehicle 102. The spatial system 100 may include the vehicle 102 and a remote network 106. The vehicle 102 may include a processor 110 arranged within a vehicle head unit, or a vehicle ECU. The processor 110 may include various vehicle systems as described in more detail with respect to FIG. 2. The processor 110 may include a spatial rendering processor 122 (as shown in FIG. 2) configured to determine when and where to playback certain alerts or information within the vehicle 102. The vehicle processor 110 and/or the spatial rendering processor 112 may each include a controller (not shown) configured to control various vehicle systems and devices.

The vehicle 102 may include a plurality of infotainment devices 112. The infotainment devices 112 may be devices configured to present information to a user, either audibly, visually, haptically, etc. For example, the infotainment devices 112 may include a vehicle speaker configured to present audible sounds within the vehicle 102. The infotainment devices 112 may include a display or projector configured to visually present information. A haptic device may also be included to provide vibrations, heating or cooling sensations, etc. One of more of these devices may make up the infotainment device 112. For example, the infotainment device 112 may include devices that provide both audio and video information (e.g., both a speaker and a display).

The infotainment devices 112 may present information to the vehicle occupants in any of the forms listed above including audio, visual, and haptic forms. The information may include various forms of infotainment, alerts, etc. In one example, the infotainment devices may present and playback audio content as requested by the user at such as a specific radio station, artist, song, content, etc. In another example, the information may present requested navigation commands as defined by a driving route to a desired destination. While most of the examples described herein are with respect to information presented audibly via vehicle speakers, visual and haptic information and alerts may also be appreciated.

The infotainment devices 112 may be arranged at various infotainment locations 114 throughout the vehicle 102. Each infotainment location 114 may be associated with one or more infotainment devices 112 arranged at that location 114. As shown in FIG. 1, for example purposes only, a first infotainment device 112a may be arranged at a front center of the vehicle 102, or a first infotainment location 114a. A second infotainment device 112b may be arranged at a front left of the vehicle 102 near the driver-side door, or a second infotainment location 114b. A third infotainment device 112c may be arranged at a front right of the vehicle 102 near the passenger-side door, or a third infotainment location 114c. A fourth infotainment device 112d may be arranged at a rear right of the vehicle 102, or a fourth infotainment location 114d. A fifth infotainment device 112e may be arranged at a rear right of the vehicle 102, or a fourth infotainment location 114e.

These infotainment locations 114 are merely examples. More or less locations in various other positions within the vehicle 102 may be possible. For example, infotainment devices 112 may be arranged in the seatbacks of the driver and passenger seats, in a center console of the vehicle, in a vehicle entertainment center on the roof of the vehicle 102, etc. Further, the infotainment device 112 may present information at more than one infotainment location 114. In the example where the infotainment device is a projector, the infotainment device 112 may project information at more than one location within the vehicle.

In the example of the infotainment device 112 including a haptic device, the haptic device may provide vibrations, heat, or cooling sensations to the user via the vehicle seat. These haptic alerts may be generated on a side of the seat relative to the event. Of example, if the event is on the left side of the vehicle, then the left side of the occupant's seat may vibrate. As explained, more than one form of alert or information may be presented to the occupant. The occupant's seat may vibrate in addition to a visual display being presented at the occupant's left.

FIG. 2 illustrates an example block diagram of the processor 110 of the spatial infotainment rendering system 100 of FIG. 1. The spatial infotainment rendering system 100 may include the spatial rendering processor 122, a connected vehicle system 124, a navigation system 126, the infotainment devices 112, and an upmixer 128.

The connected vehicle system 124 may include one or more systems facilitated via connected car or connected vehicle telematics. These systems may include features available on a separate mobile device, usually a mobile device of the driver. The processor 110 of the vehicle 102 may communicate wirelessly with the mobile device (not shown) to access data within the mobile device such as the driver's calendar, navigation system, GPS antenna, etc. The data may include data specific and local to the mobile device of the driver such as music, photos, etc. The data may also include dynamic data provided from external sources such as weather information, traffic information, etc. This "event data" may relate to instances typically affecting navigation of the vehicle 102. In addition to or in alternative to the connected vehicle system 124, the processor 110 may receive data from the network 106, other mobile devices, etc.

The navigation system 126 may include a GPS module configured to provide current vehicle location and vehicle direction information. The navigation system 126 may receive updated navigation information from the network 106 such as road closures, construction, openings, etc. The navigation system 126 may provide route information and navigation commands for display and output via the infotainment devices 112 so as to provide a driving route and related instructions based on a current vehicle location and a waypoint or destination. The navigation system 126 may receive the destination via the connected vehicle system 124 or via a user input at the head-unit or display of the vehicle 102.

The spatial rendering processor 122 may be configured to receive information from the connected vehicle systems 124 and the navigation system 126. This information may include information related to the current location of the vehicle 102, the current direction or orientation of the vehicle 102, and the event data. The current location of the vehicle 102 may be determined by the vehicle's GPS module. The direction or orientation of the vehicle 102 may be determined by the navigation system 126 by reviewing the vehicle's location over time. The event data, as explained above, may include traffic information or a weather instance that may affect navigation or the route of the vehicle 102.

The spatial rendering processor 122 may be configured to analyze the event data in view of the current direction and location of the vehicle 102. The spatial rendering processor 122 may determine whether the event data indicates an event that could affect the current driving route. For example, a traffic could potentially create a delay or alter the driving route, a weather event such as a storm, heavy rain, or tornado could also be relevant to the driver. If these events are within a predefined distance of the vehicle 102, the driver may desire to be made aware of these events.

The spatial rendering processor 122, upon determining that an event is within a predefined distance (e.g., 10 miles) of the vehicle 102, may instruct the infotainment device 112 to emit an event alert alerting the driver to the event. For example, the alert may indicate "bad weather in 10 miles," or "traffic ahead." Due to the increased alerts and information provided by vehicle displays, this alert may be ignored, or may fail to give the driver enough information such as where the event is taking place. In order to increase the driver's awareness of the event, the spatial rendering processor 122 may determine which direction relative to the vehicle 102 the event is located, and select one of the infotainment devices 112 closest to the event to transmit the alert.

Figure 3:
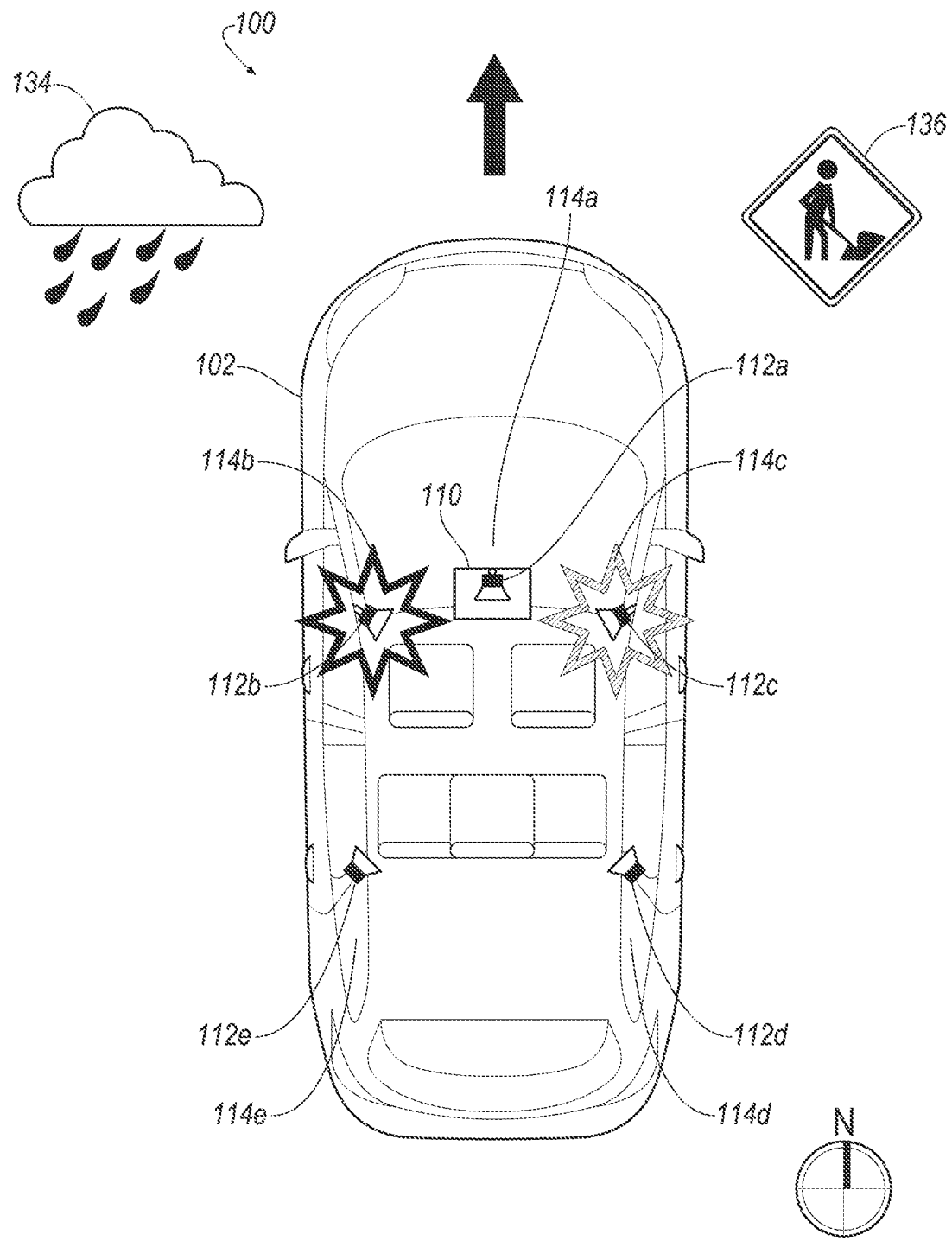
FIG. 3 illustrates an example event relative to a vehicle.

FIG. 3 illustrates an example event relative to a vehicle 102. FIG. 3 illustrates the vehicle traveling north. A first even 134 may be arranged to the north east. In the example shown, the first event 134 may be a storm. Because the storm is located north east of the vehicle 102, the spatial rendering processor 122 may determine that the event alert should be emitted from the second infotainment device 112*b* at the second location 114*b*.

In another example, a second event 136 may occur in the north west. In the example shown, the second event 136 may be road construction. Because the construction is located north west of the vehicle 102, the spatial rendering processor 122 may determine that the event alert should be emitted from the third infotainment device 112*c* at the third location 114*c*.

Returning to FIG. 2, the spatial rendering processor 122 may be in communication with the upmixer 128. The upmixer 128 may be a processor such as a Quantum Logic surround sound processor configured to receive an audio signal associated with the event alert and process the audio signal for appropriate playback at a certain infotainment device 112. The upmixer 128 may adjust the gain of the audio signal, as well as apply various filters such as high and low shelf filters to add reflections to the audio signal. The upmixer 128 may split the audio signal into multiple infotainment devices 112 and adjust the gains at each so that the infotainment device 112 associated with the event location may have the highest gain to reflect the direction of the event relative to the vehicle 102. In one example, the gain of one signal associated with the selected infotainment device 112 may be increased while all other gains are decreased to zero, or muted. The process for adjusting the gains is described in more detail below with respect to FIG. 5.

The upmixer 128 may include an Ambisonic upmixer 142 and/or a surround sound engine 144. The Ambisonic upmixer 142 may be a full-sphere surround sound technique that places sound anywhere in a 360° spherical location using a plurality of speakers position above, below and in a horizontal plane of a listener.

Figure 6:
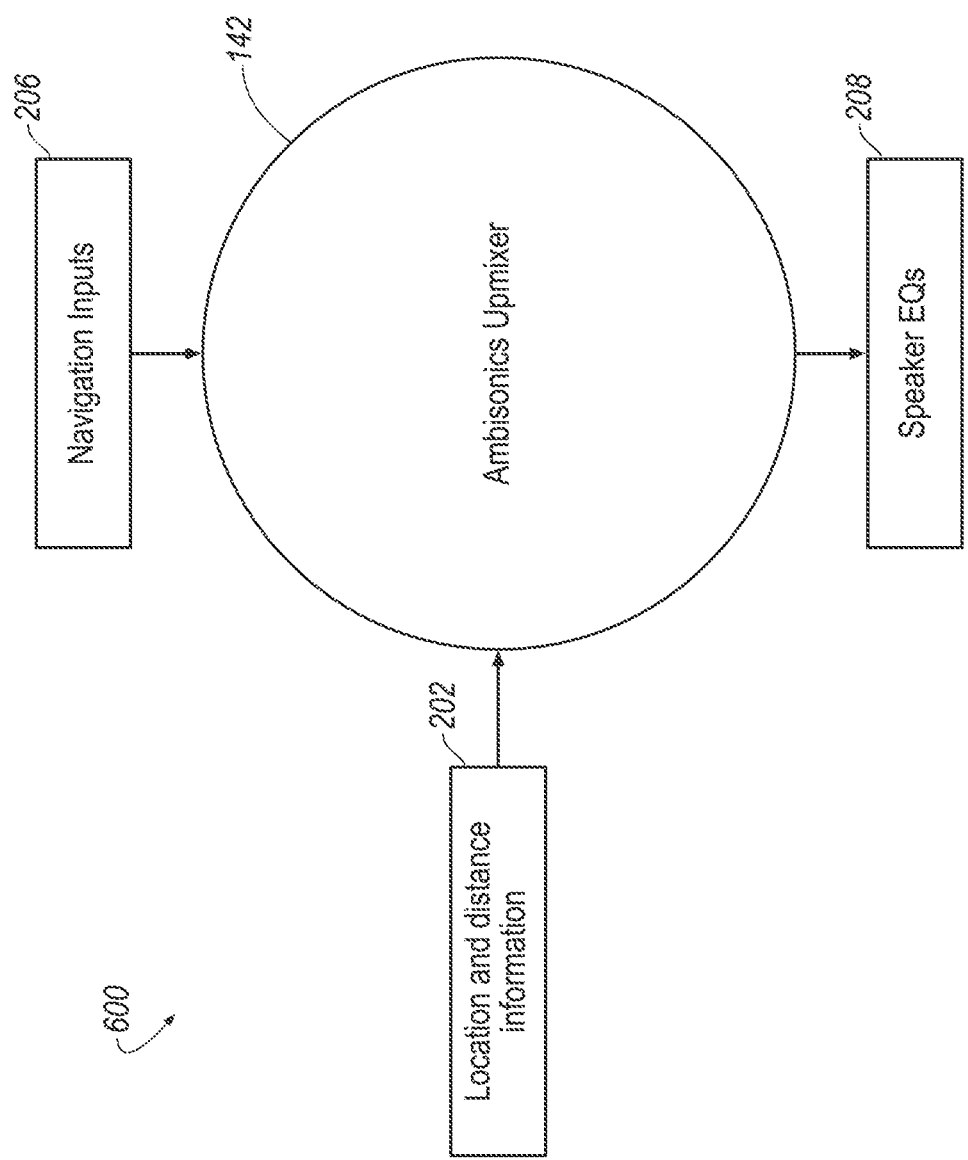
FIG. 6 illustrates an example process for an Ambisonic upmixer.

FIG. 6 illustrates an example process 600 for an Ambisonic upmixer 142. The Ambisonic upmixer 142 may receive navigation inputs 206 from the navigation system 126. The Ambisonic upmixer 142 may also receive location and direction information 202 from the navigation system 126 and/or the connection vehicle system 124. The Ambisonic upmixer 142 may process the audio signal by applying the location and direction information 202 and provide an output to a speaker equalizer 208 to be played by the infotainment devices 112.

Returning to FIG. 2, the upmixer 128 may include a surround sound stereo upmixer 144. The surround sound stereo upmixer 144 may be a Quantum Logic surround sound processor.

Figure 7:
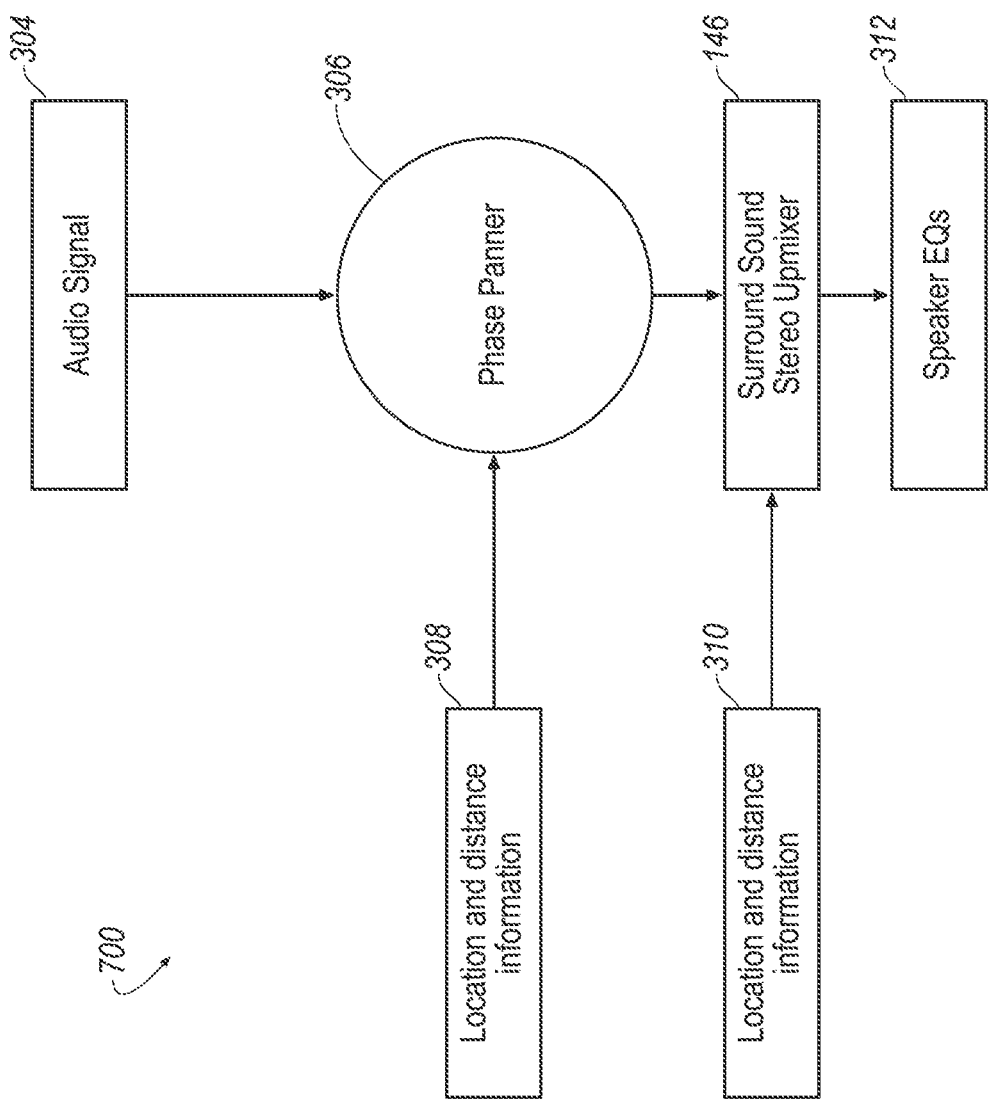
FIG. 7 illustrates an example process for a surround sound stereo upmixer

FIG. 7 illustrates an example process 700 for the surround sound stereo upmixer 144. The audio signal 304 may be received at a phase panner 306. The phase panner 306 may receive the current location and direction information 308 of the vehicle 102. The direction information is used by the panner 306 to modify the audio signal to reflect a direction association with the event. For example, the panner 306 may know that traffic is upcoming on the right of the vehicle 102. In this example, the panner 306 may modify the audio signal to reflect playback of an audio signal that will be perceived to the right side of the vehicle 102.

The distance information 301 may also be supplied to the upmixer 146 and the audio signal is further adjusted to add in early reflections to add a sense of depth to the audio signal. The audio signal is output to the speaker equalizers 312. The user will not only hear the prompt, but they will detect the distance and direction of the upcoming prompt based on the perceived audio when the prompt is played back at the infotainment devices 112.

Figure 4:
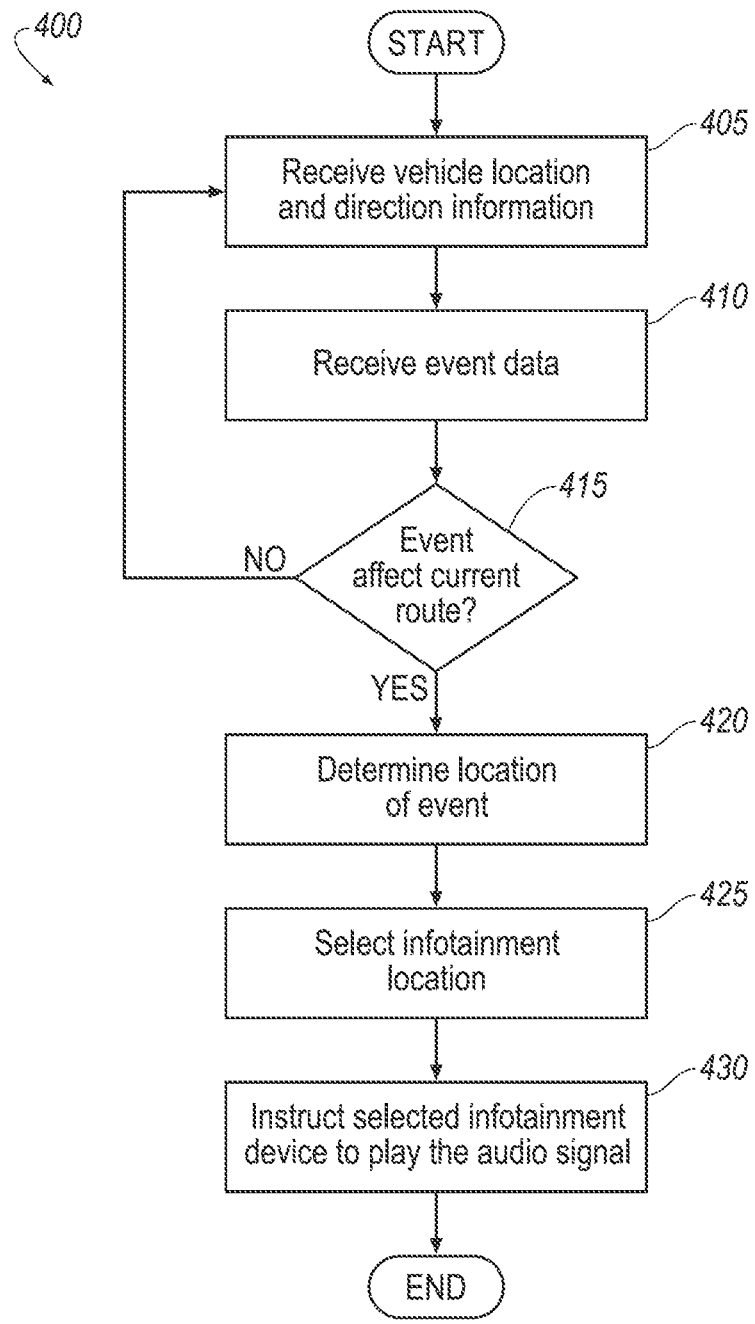
FIG. 4 illustrates an example process for the spatial infotainment rendering system.

FIG. 4 illustrates an example process 400 for the spatial infotainment rendering system 100. The process 400 may begin at block 405 where the processor 110 may receive the vehicle location and direction information. As explained above, the vehicle location and direction information may be received from the navigation system 126, the connected vehicle system 124, or other systems and devices.

At block 410, the processor 110 may receive the event data. The event data may include the type and location of an event such as weather or traffic. The event data may be received from the navigation system 126, the connected vehicle system 124, or other systems and devices.

At block 415, the processor 110 may analyze the event data and the location and direction information to determine whether the event may affect the current route of the vehicle. In one example, the processor 110 may determine whether the event is within a predefined distance of the vehicle location (e.g., 10 miles.) If the event may affect the current route, the processor 110 may generate an audio signal associated with the event and the process 400 proceeds to block 420. If not, the process returns to block 405.

At block 420, the processor 110 may determine the location of the event relative to the vehicle 102. This determination may be based on the event location, the current location of the vehicle 102 and the direction of the vehicle.

At block 425, the processor 110 may select one or more infotainment locations 114 and associated infotainment device based on the event location.

At block 430, the processor 110 may instruct the selected infotainment device 112 to play the audio signal.

The process 400 may then end.

Figure 5:
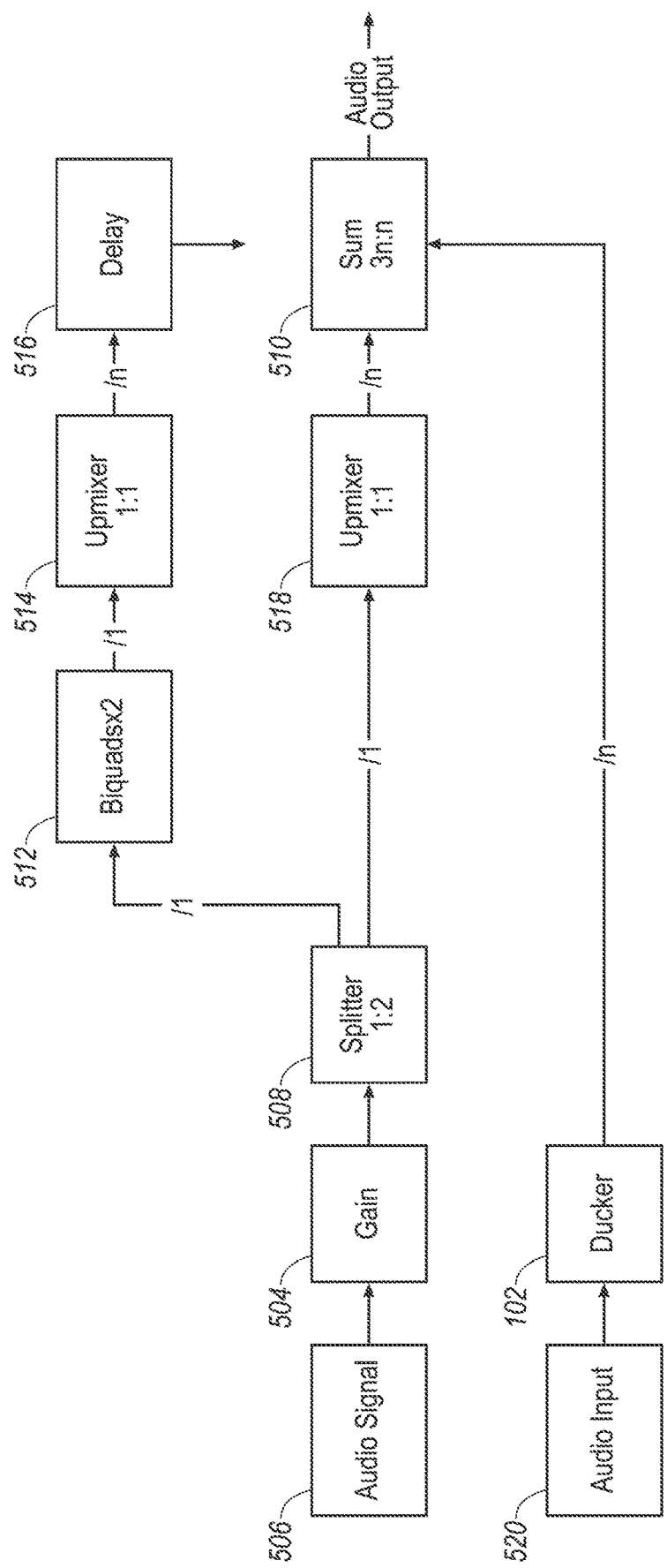
FIG. 5 illustrates an example block diagram for implementing the spatial infotainment rendering system.

FIG. 5 illustrates an example block diagram for implementing the spatial infotainment rendering system 100. The audio input 506 may include the audio signal generated in response to the event location being within a predefined distance of the vehicle 102. The audio signal may include an audible playback phrase such as "traffic ahead" or "storm to the west." A gain 504 may be applied to the input 506. The system 100 may include a splitter 508 configured to split the audio signal. The signal may be split due to not all of the speaker outputs needing to be subject to the signal processing. That is, only a portion of the infotainment devices 112 may output the audio signal and the audio signal may be split to avoid undue processing.

The system 100 may include filters 512 that are applied to the split audio signal. The filters 512 may include high and low shelf filters configured to add reflections to the audio signal. The added reflects are based on the direction information. A stereo upmixer 514 may split the audio signal into multiple speaker outputs, each output having a gain specific to the speaker. The gains may reflect the direction information associated with the event location, as described above.

A delay 516 may be added to current audio input 522 to provide a depth based on the distance of the event from the vehicle location. The summer 510 may then sum the output. The audio input from the vehicle sound system is subjected to a ducker 520. The ducker 520 may reduce or mute the playback of any other audio that isn't associated with the event alert being played back to the driver.

Accordingly, a spatial recognition system configured to output alerts to a driver at a location within the vehicle corresponding to the location of the event relative to the vehicle is described herein.

Computing devices described herein generally include computer-executable instructions, where the instructions may be executable by one or more computing or hardware devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A spatial infotainment rendering system, comprising:
at least one infotainment device configured to present information to a vehicle occupant traveling along a vehicle route at one of a plurality of infotainment locations within the vehicle;
at least one spatial rendering processor configured to:
receive vehicle location and direction information of the vehicle along the vehicle route;
receive event data indicative of an event having a potential to affect the vehicle route;
determine an event location based on event data; and
select one of the infotainment locations based on the event location relative to the vehicle location and direction, the selected infotainment location including the at least one infotainment device to present event information to the vehicle occupant at a location within the vehicle spatially related to the event location relative to the vehicle route.

2. The system of claim 1, wherein the processor is further configured to determine whether the event is within a predefined distance of the vehicle location.

3. The system of claim 1, wherein the processor is further configured to determine whether the event is along the vehicle route.

4. The system of claim 1, wherein the at least one infotainment device includes a projector configured to visually project the event information at the selected infotainment location.

5. The system of claim 1, wherein the at least one infotainment device includes a display configured to visually display the event information at the selected infotainment location.

6. The system of claim 1, wherein the at least one infotainment device includes a speaker configured to audibly project the event information at the selected infotainment location.

7. The system of claim 1, wherein the at least one infotainment device includes a plurality of vehicle speakers arranged within the vehicle, each configured to play an audible signal.

8. The system of claim 7, further comprising at least one splitter configured to selectively split an audio signal wherein the speaker at the selected infotainment location receives the audio signal.

9. The system of claim 7, wherein the processor is further configured to increase a gain of the speaker at the selected infotainment location relative to the other speakers to indicate the spatial presence of the event.

10. The system of claim 1, wherein the at least one infotainment device includes a haptic device configured to haptically alert the vehicle occupant of the event at the selected infotainment location.

11. A method for spatially providing information about an upcoming event along a vehicle route, comprising:
receiving vehicle location and direction information of a vehicle along a vehicle route;
receiving event data indicative of an event having a potential to affect the vehicle route;
determining whether the event is within a predefined distance of the vehicle location;
determining whether the event is along the vehicle route;
selecting, in response to the event being within a predefined distance of the vehicle location and along the vehicle route, an infotainment location within the vehicle based on the event location relative to the vehicle location and direction; and
presenting event information to a vehicle occupant relating to the event at a location spatially related to the event location relative to the vehicle route based on selecting the infotainment location.

12. The system of claim 11, wherein the presenting event information includes visually projecting the event information at the selected infotainment location.

13. The system of claim 11, wherein the presenting event information includes visually displaying the event information at the selected infotainment location at a vehicle display.

14. The system of claim 11, wherein the presenting event information includes audibly projecting the event information to the selected infotainment location.

15. The system of claim 14, wherein the presenting event information includes increasing a gain of the audible projection at the selected infotainment location.

16. The system of claim 11, wherein the presenting event information includes haptically alerting the vehicle occupant of the event at the selected infotainment location.

17. A spatial infotainment rendering system for a vehicle, comprising:
   at least one infotainment device configured to present information to a vehicle occupant traveling along a vehicle route at one of a plurality of infotainment locations within the vehicle;
   at least one spatial rendering processor configured to
      receive vehicle location and direction information of a vehicle along a vehicle route;
      receive event data indicative of an event having a potential to affect the vehicle route;
      determine whether the event is within a predefined distance of the vehicle location;
      determine whether the event is along the vehicle route; and
      select, in response to the event being within a predefined distance of the vehicle location and along the vehicle route, an infotainment location within the vehicle based on the event location relative to the vehicle location and direction to present event information to a vehicle occupant relating to the event at a location spatially related to the event location relative to the vehicle route.

18. The system of claim 17, wherein the at least one infotainment device includes a projector configured to visually project the event information at the selected infotainment location.

19. The system of claim 17, wherein the at least one infotainment device includes a display configured to visually display the event information at the selected infotainment location.

20. The system of claim 17, wherein the at least one infotainment device includes a speaker configured to audibly project the event information at the selected infotainment location.

* * * * *